Figure 2:
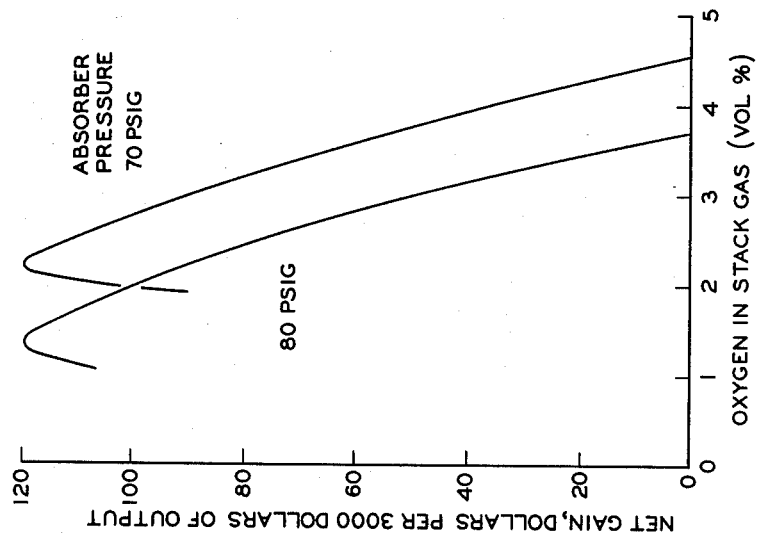

March 12, 1963  J. R. PARSONS  3,081,153
AUTOMATIC OPTIMUM AIR ADDITION TO NITRIC OXIDE
ABSORPTION IN NITRIC ACID PRODUCTION
Filed March 13, 1959  3 Sheets-Sheet 1

INVENTOR.
J. R. PARSONS
BY
Hudson & Young
ATTORNEYS

March 12, 1963 J. R. PARSONS 3,081,153
AUTOMATIC OPTIMUM AIR ADDITION TO NITRIC OXIDE
ABSORPTION IN NITRIC ACID PRODUCTION
Filed March 13, 1959 3 Sheets-Sheet 2

INVENTOR.
J. R. PARSONS
BY
Hudson Young
ATTORNEYS

3,081,153
AUTOMATIC OPTIMUM AIR ADDITION TO NITRIC OXIDE ABSORPTION IN NITRIC ACID PRODUCTION
James R. Parsons, Bartlesville, Okla., assignor to Phillips Petroleum Company, a corporation of Delaware
Filed Mar. 13, 1959, Ser. No. 799,250
4 Claims. (Cl. 23—162)

This invention relates to the production of nitric acid. In one of its aspects, the invention relates to the control of the addition of oxygen (air), to an absorber tower in the production of nitric acid by absorbing oxides of nitrogen into water, responsive to a consideration of the oxygen in the gases in the stack from the absorber in view of, say, the dollar value of nitric acid lost as nitrogen oxides in the said gases and the dollar value of additional nitric acid which can be produced by diverting air from the absorber tower to production of oxides, as in ammonia oxidation, to produce the oxides which are absorbed into the water to produce the nitric acid. In another of its aspects, the invention relates to an apparatus for the conversion of ammonia oxidation reaction gases containing nitrogen oxides by absorbing said gases into water in the presence of additional or "bleach" air, the apparatus comprising, in combination, an absorber tower, an inlet for reaction gases containing nitrogen oxides at a point in said tower, an inlet for bleach air at another point in said tower, an outlet from said tower for removing acid as a product from said tower, an outlet for removing gases from a portion of said tower above the reaction gases and bleach air inlets to said tower, means for determining the concentration of nitrogen oxides in gases in said outlet for removing gases from said tower, means for feeding bleach air to said inlet for said bleach air, means upon said last-mentioned means to control to a predetermined rate the flow of bleach air to said inlet for bleach air, means to change said predetermined rate to which the means to control controls said flow, said means to change being adapted to cause to occur a change in said predetermined rate to which said means to control controls said flow, to cause a change in nitrogen oxides in gases in said outlet for removing gases from said tower and being also adapted to ratio the last-mentioned change and the change in predetermined rate caused by said means to change to compare the ratio thus obtained with a value for said ratio to which said means to change has been adjusted and to readjust said predetermined rate of flow of bleach air until the compared ratio and the ratio to which said means to change has been adjusted are substantially identical.

In a further aspect of the invention, it relates to method and means for determining nitrogen oxides in stack gases from the absorber (yield loss) by determining separately the nitrogen oxides and the oxygen contents of said gases and then determining yield loss which is ratioed with said change in predetermined rate, the apparatus comprising a nitrogen oxides analyzer, an oxygen analyzer, means for recovering a flow of energy from each of said analyzers, representative of the analyses made by them, respectively, and for converting the flows into a final energy flow representing said yield loss.

Figure 1:
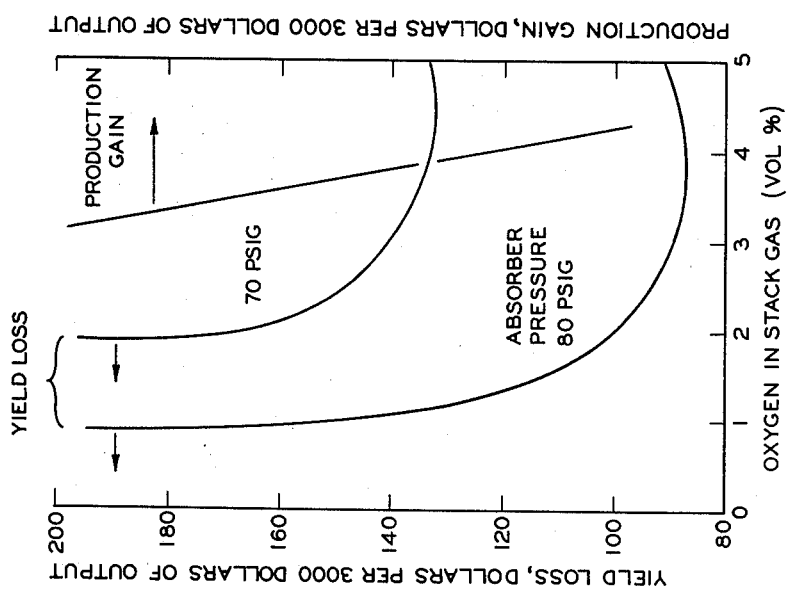
Figure 4:
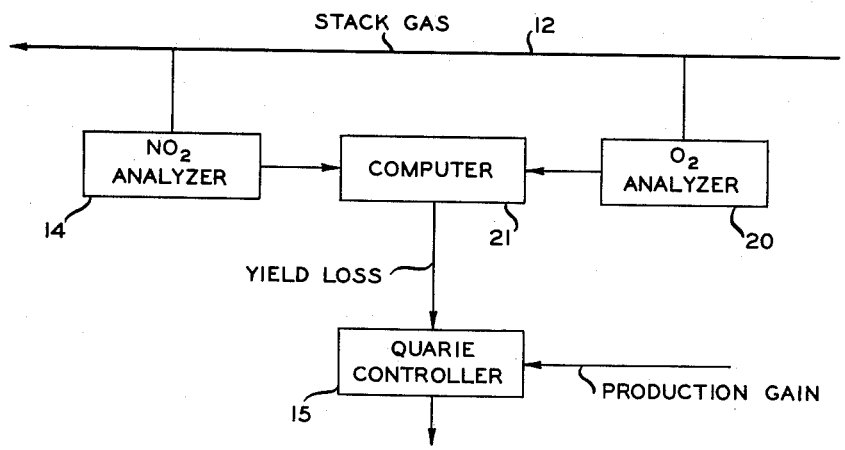
Figure 3:
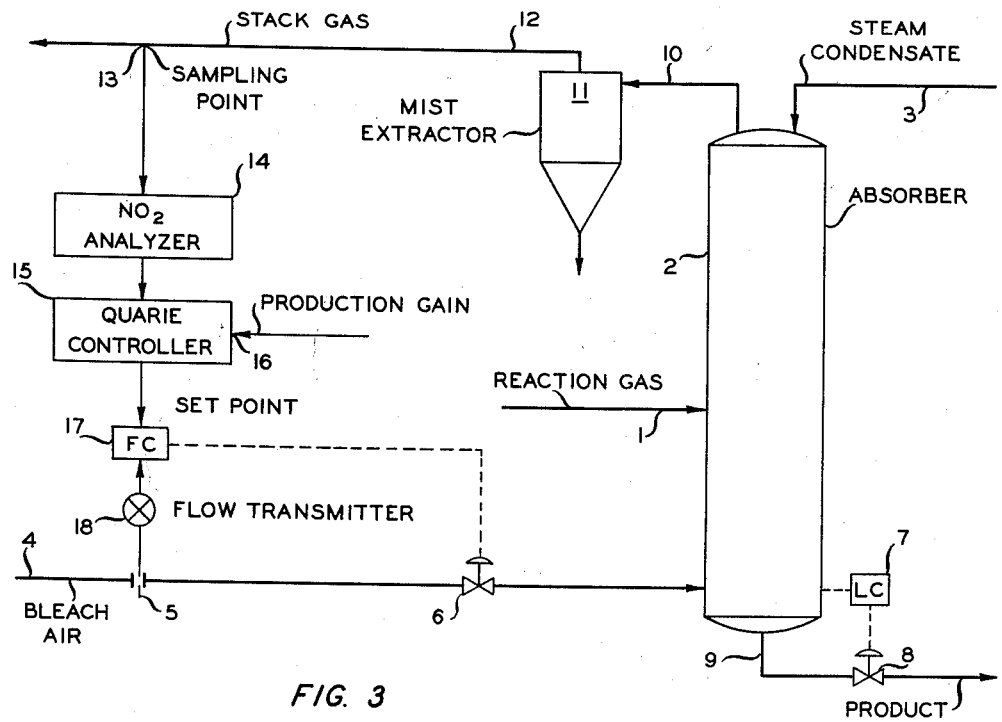
Figure 6:
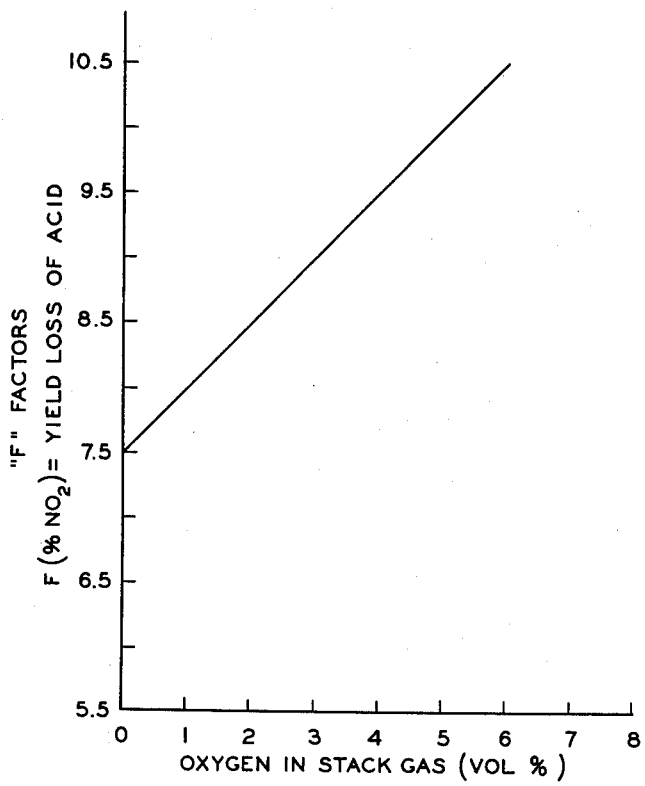
Figure 5:
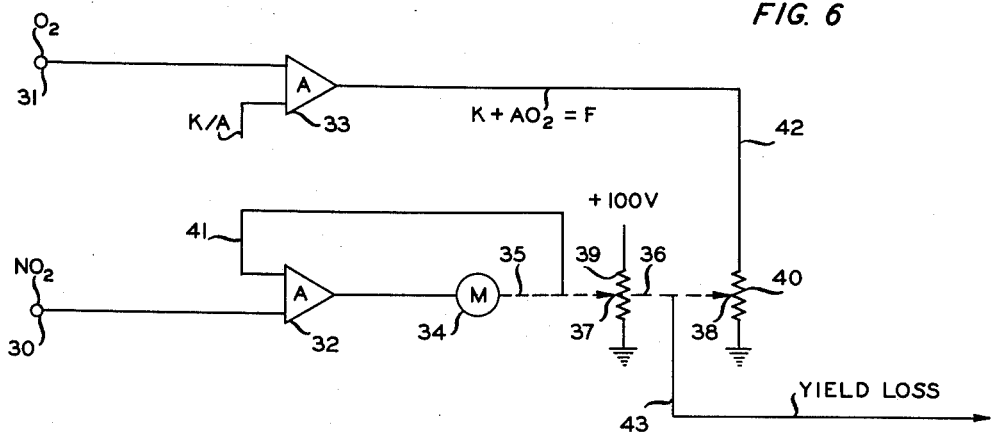

In the drawings, FIGURE 1 shows yield loss and production gain as functions of the excess oxygen in the stack gases. FIGURE 2 shows net gain in dollars obtained by diverting air from bleach to production at different absorber pressures in relation to oxygen in the stack gases. FIGURE 3 is a diagrammatic showing of the principal components of a system according to the invention. FIGURE 4 shows diagrammatically how yield loss can be and is determined according to the invention, taking into account not only the nitrogen oxides in the stack gas but also the oxygen therein. FIGURE 5 shows a diagram of the computer of FIGURE 4. FIGURE 6 shows a plot of "F" factors which are multiplied by the $NO_2$ content of the stack gas to obtain yield loss of acid.

In the manufacture of nitric acid by the pressure process, nitrogen oxides obtained by oxidation of ammonia with air are absorbed directly in water in an absorption tower. The important reactions are:

$2NO+O_2 \rightleftharpoons 2NO_2+27,100$ calories
$2NO_2 \rightleftharpoons N_2O_4+13,000$ calories
$3NO_2+H_2O \rightleftharpoons 2HNO_3+NO+27,600$ calories Additional oxygen must be supplied to the absorber column to oxidize the NO evolved from the reaction of $NO_2$ with water. The air supplying this additional oxygen, known as bleach air, is usually supplied at the base of the tower and flows upward countercurrent to the flow of liquid down the column.

It is economically important to add just the right amount of bleach air to the system. Too little bleach air results in a loss of NO out the stack while too much bleach air represents a power loss (power required to compress air). Also, since a nitric acid plant is usually air-supply limited, the use of excess air for bleach represents a direct loss in production of nitrogen oxides in the ammonia oxidation step.

As noted, FIGURE 1 shows yield loss and production gain as functions of the excess oxygen in the stack. Excess oxygen in the stack gases is a function of the amount of bleach air added to the system. Yield loss is the loss in yield of nitric acid resulting from the nitrogen oxides which are discharged to the stack. In FIGURE 1, it is expressed in terms of its market value in dollars. Production gain is the increased production (again expressed in terms of its market value) of acid which could have been achieved had the bleach air been used for ammonia oxidation.

A family of curves, such as shown in FIGURE 1, exists with absorber tower pressure as a parameter. There are other parameters, such as acid strength, mix composition of the feed to the ammonia oxidation converter, conversion efficiency, etc. Consequently, it is not possible to pick an optimum value of excess oxygen for all operating conditions. In fact, the optimum is continually changing. Therefore, some means of automatically and continuously seeking this optimum is needed.

An object of the invention is to provide an improved method and means for the production of nitric acid. Another object of the invention is to provide a method and means whereby to obtain maximum dollar profit from a nitric acid producing system which is not to be obtained necessarily by maximum production of said acid. A further object of the invention is to provide a method and means for taking into account market conditions in the production of nitric acid by the ammonia oxidation-water absorption of the oxides of nitrogen thus produced process.

Other aspects, objects and the several advantages of the invention are apparent from this disclosure, the drawings and the appended claims.

The invention is further described herein in conjunction with an optimizing controller which can be any commercially available instrument which produces a signal output to alter the value of a process variable, receives a measured value from the process relative to the effect of the change imposed, computes the ratio of the measured effect to the change imposed, compares this ratio to a desired ratio and produces a new signal of the proper direction and magnitude to decrease the difference between actual and desired ratio. Such an optimizing controller is the Quarie Optimal Controller manufactured by Quarie Controllers, Sharon, Mass. The Quarie Controller can be used as the said means to change, earlier mentioned, which causes the change in the bleach air feed rate and then compares this change with the change in stack gas composition and then "hunts," if necessary, to adjust the rate of flow of bleach air which is maintained, say, by way of a flow recorder controller, to that value at which the comparison or ratio it has just determined becomes the same as a predetermined value for said ratio it is to maintain. The Quarie Optimal Controller is discussed in an article appearing in Instruments and Automation, November 1956, pages 2212–2216. Since the details and internal operation of the Quarie Controller do not form a part of this invention, except as said controller can be used as said means to change, earlier described, a detailed description thereof is omitted from this specification. However, as one skilled in the art will understand, reading this disclosure, the Quarie controller is described herein by reference to the said article which, in turn, refers to other articles. The substance of said other articles is also incorporated herein by reference.

It can be seen in FIGURE 1 that the yield loss has a minimum value. This would be the correct operating point for maximum efficiency. However, it is desired to make maximum profit and this frequently does not coincide with maximum efficiency. Maximum profit occurs where the slopes of the two curves, yield loss and production gain, are equal. A change in excess oxygen in either direction from this point of equal slopes results in a decrease in net dollar gain. This is shown in FIGURE 2. For example, at 80 p.s.i.g. absorber pressure the oxygen in stack gas is about 1.3 percent for maximum net gain in dollars by diverting air from bleach to production.

Since the shape and coordinate location of the yield loss curves change with operating conditions (see FIGURE 1 where curves are plotted for two different operating pressures), the location of the equal slope point on the yield loss curve must also change. Therefore, it is a problem to maintain the excess oxygen at the value to produce maximum profit under all operating conditions at all times. A method for achieving the desired self-optimizing behavior which overcomes the problem is shown in FIGURE 3.

Referring now to FIGURE 3, nitrogen oxide reaction gases, as from the oxidation of ammonia, are passed by way of pipe 1 into absorber tower 2. In this tower, the gases are contacted by steam condensate, obtained in the operation by means not shown, and introduced into tower 2 by way of pipe 3. Bleach air, as described, is passed by way of pipe 4 through flow orifice 5, control valve 6 into absorber tower 2. Flow transmitter 18 sends a signal, proportional to the flow of bleach air in line 4, to flow recorder controller 17. Bottoms in the tower are maintained at a desired level by means of liquid level controller 7 and valve 8 in product acid withdrawal pipe 9. Overhead from the absorber tower is taken off by way of pipe 10, passed through mist extractor 11 and from the system by way of pipe 12. Gases in pipe 12 are sampled at a sampling point 13 and analyzed in an $NO_2$ analyzer 14. In this instance, a colorimetric analyzer measures the total nitrogen oxides as $NO_2$. A signal from the $NO_2$ analyzer 14 is passed to Quarie controller 15. The Quarie controller is set for a desired slope, the characteristics of which are discussed herein, this being indicated at 16. The Quarie controller is operative to change the set point of the bleach air flow recorder controller 17, the latter controlling valve 6 in pipe 4.

The stack gas $NO_2$ analyzer measures the total nitrogen oxides in the gases from the top of the absorber tower. The sampling system associated with the instrument oxidizes all NO in the stream to $NO_2$ and the instrument, namely, the colorimetric analyzer, measures the total nitrogen oxides as $NO_2$. The analyzer and its application to stack gas analysis are disclosed, described and claimed in Serial No. 733,558, filed May 7, 1958, now Patent No. 2,974,227, by Horace L. Fisher and Elmer C. Miller.

The output of the $NO_2$ analyzer is proportional to the yield loss in the stack gas. This signal is fed into the Quarie controller. The second input to the Quarie is a constant value (manually adjustable) proportional to the slope of the production gain curve. This constant is solely dependent upon economic factors such as the value of nitric acid and the demand for it. The output of the Quarie controller alters the set point of flow recorder controller 17 on the bleach air system.

In operation, the Quarie controller makes a change in the set point of flow recorder controller 17 (which changes the bleach air flow) and waits to see what effect this change has on the $NO_2$ in the absorber overhead gases as measured by the $NO_2$ analyzer. This is equivalent to making a small change ($\Delta x$) in the abscissa of FIGURE 1 and noting the change in ordinate ($\Delta y$) which results along the yield loss curve. By ratioing $\Delta y$ to $\Delta x$ the slope of the curve at the particular point selected is determined. The Quarie controller operates to determine automatically said slope. It then compares this slope with the value set into it as a constant at 16. If the slopes are not equal, the Quarie controller proceeds to alter the bleach air flow rate until the referenced slope is attained.

If process variables change in such a fashion as to alter the yield loss-excess oxygen relationship, the Quarie controller will systematically seek out a new operating point at which the slope is equal to the reference constant set into this controller. Should economic conditions change in such a manner as to change the slope of the production gain-excess oxygen relationship, it is only necessary to manually introduce the slope of the new characteristic into the controller.

While there are many applications for the type of controller which seeks to maximize or minimize one variable with respect to another (slope=0), the application herein described is unique in that it seeks to maintain a prescribed slope other than zero between the measured and manipulated variables, thereby maximizing profit.

The operation of FIGURE 3 can be made more accurate, according to the present invention, by computing the actual value of yield loss rather than using as a measurement thereof the $NO_2$ in the stack gases. Thus, more precisely, the yield loss can be calculated from total nitrogen oxides in the stack corrected for the dilution effect of oxygen therein.

Referring now to FIGURE 4, there is shown a modification of a portion of FIGURE 3 wherein, in addition to $NO_2$ analyzer 14, there is provided an $O_2$ analyzer 20. Signals from these analyzers pass to a computer 21 which furnishes a yield loss signal to the Quarie controller 15.

Referring now to FIGURE 5, there is shown the electrical diagram of the yield loss computer 21 of FIGURE 4. The signal from analyzer 14 in FIGURE 4, corresponding to 30 in FIGURE 5, proportional to the volume percentage of $NO_2$ in the stack gases, passes to servo amplifier 32 which drives servo motor 34. The servo motor 34 is mechanically linked by shafts 35 and 36 to the contactors 37 and 38 of potentiometers 39 and 40, respectively. Potentiometer 39 is connected at one end to a voltage source, for example, 100 volts, and at its other end to ground. Contactor 37 supplies a feedback signal to amplifier 32 by means of conductor 41. The aforementioned components form a self-balancing divider, in that the relative shaft positions of motor 34 represent the value $NO_2/100$ when the feedback signal 41 balances the input signal 30. As thus described, amplifier 32 will cause servo motor 34 to rotate shafts 35 and 36 and move associated contactors 37 and 38 of potentiometers 39 and 40, respectively, such that the relative position of shaft 36 represents the percentage of $NO_2$ in the stack gases. An electrical signal proportional to the percentage of $O_2$ in the stack gases from analyzer 20 in FIGURE 4, corresponding to 31 in FIGURE 5, passes to amplifier 33 in FIGURE 5. Referring now to FIGURE 6, a plot of conversion factors for converting the loss of $NO_2$ in the stack gases to yield loss of $HNO_3$ is given as a function of oxygen content of said stack gases. The plot of conversion factors of FIGURE 6 may be expressed algebraically by the equation $$F = K + A \text{ (percent } O_2\text{)}$$

where:

$F$ = conversion factor for converting loss of $NO_2$ to yield loss of $HNO_3$.
$K = 7.5$ = intercept of line in FIGURE 6.
$A = 0.437$ = slope of line of FIGURE 6.

The above equation is a simple stoichiometric relationship for converting $NO_2$ to equivalent $HNO_3$ taking into account the dilution effect of the excess oxygen present. Its derivation should be apparent to those skilled in the art.

Returning now to FIGURE 5, electrical signal 31, representing oxygen concentration in the stack gases, is multiplied by factor $A$, the result added to factor $K$ by amplifier 33 such that the output signal of amplifier 33 equals the conversion factor $F$. A signal representing factor $F$ passes by means of conductor 42 to one end of potentiometer 40, the other end of which is grounded. Contactor 38 of potentiometer 40 has been positioned by shaft 36 to represent $NO_2$ concentration and thus the signal from conductor 43 which is connected to contactor 38 represents the product of $NO_2$ concentration times the conversion factor $F$, or yield loss of $HNO_3$.

Reasonable variation and modification are possible within the scope of the foregoing disclosure, the drawings and the appended claims to the invention, the essence of which is that there have been provided a method and an apparatus for automatically optimizing bleach air addition in a nitric acid plant to obtain maximum dollar value, the method according to the invention comprising passing ammonia and air into a system, therein oxidizing ammonia with said air producing nitrogen oxides, absorbing said oxides in water in an absorbing zone, feeding a portion of said air fed to the system as bleach air to said absorbing zone, removing product acid from said zone, controlling bleach air flow to said zone to a predetermined value, removing gases from the absorbing zone, measuring the nitrogen oxides content of the gases, causing a change in the said predetermined value, determining the change in said nitrogen oxides content of the gases, ratioing said change which has been caused and the change in said nitrogen oxides content, comparing the ratio thus obtained with an earlier determined desirable ratio and controlling bleach air flow at a new value which ratios with said nitrogen oxides content at said earlier determined desired ratio and passing the remaining air to the ammonia oxidation; the apparatus comprising, in combination, an absorber tower, an inlet for reaction gases containing nitrogen oxides at a point in said tower, an inlet for bleach air at another point in said tower, an outlet from said tower for removing acid as a product from said tower, an outlet for removing gases from a portion of said tower above the reaction gases and bleach air inlets to said tower, means for determining the concentration of nitrogen oxides in gases in said outlet for removing gases from said tower, means for feeding bleach air to said inlet for bleach air, means upon said last-mentioned means to control to a predetermined rate the flow of bleach air to said inlet for bleach air, means to change said predetermined rate to which the means to control controls said flow, said means to change being adapted to cause to occur a change in said predetermined rate to which said means to control controls said flow, to cause a change in nitrogen oxides in gases in said outlet for removing gases from said tower and being also adapted to ratio the last-mentioned change and the change in predetermined rate caused by said means to change to compare the ratio thus obtained with a value for said ratio to which said means to change has been adjusted and readjust said predetermined rate of flow of bleach air until the compared ratio and the ratio to which said means to change has been adjusted are substantially identical and means for diverting air not required to reach said substantially identical ratio from the absorber.

I claim:

1. A method for the production of nitric acid which comprises passing ammonia and air into a system, therein oxidizing ammonia with said air producing nitrogen oxides, absorbing said oxides in water in an absorbing zone, feeding a portion of said air fed to the system as bleach air to said absorbing zone, removing product acid from said zone, controlling bleach air flow to said zone to a predetermined value, removing gases from the absorbing zone, measuring the nitrogen oxides content of the gases, causing a change in the said predetermined value by changing said flow of bleach air, determining the change in said nitrogen oxides content of the gases removed from the absorbing zone produced by the first mentioned change, ratioing said change from said predetermined value which has been caused by changing said flow of bleach air and the change in said nitrogen oxides content of the gases removed from the absorbing zone, comparing the ratio thus obtained with an earlier determined desirable control ratio and then controlling bleach air flow at a new value which ratios with said nitrogen oxides content at said earlier determined desirable control ratio and passing the remaining air to the ammonia oxidation.

2. A method according to claim 1 wherein, when determining the nitrogen oxides content of the gases, there is also determined the oxygen content of said gases thus obtaining a more accurate value for the yield loss of the system and wherein the ratios which are desired and determined, respectively, take this into account.

3. An apparatus for oxidizing ammonia to nitrogen oxides and absorbing the nitrogen oxides to produce nitric acid which comprises means, in combination, as follows: means for oxidizing ammonia with air in the system, means for feeding air to the system, means for absorbing nitrogen oxides produced by the oxidation of ammonia in water, means for passing a portion of the air fed to the system to said means for absorbing nitrogen oxides in water, means for measuring nitrogen oxides content of residual gases taken off from said means for absorbing nitrogen oxides in water, means to control to a predetermined rate the flow of air fed to said means for absorbing, means to change said predetermined rate to which the means to control controls said flow, said means to change being adapted to cause a change in said predetermined rate of flow of air to which said means to control controls said flow, to cause a change in nitrogen oxides in the gases removed from said means for absorbing nitrogen oxides in water and said means to change being also adapted to ratio the last-mentioned change and the change in predetermined rate of flow of air caused by said means to change, to compare the ratio thus obtained with a value for said ratio to which said means to change has been adjusted and to readjust said predetermined rate of flow of air until the compared ratio and the ratio to which said means to change has been adjusted are substantially identical.

4. An apparatus according to claim 3 wherein the combination comprises means to analyze both the nitrogen oxides and oxygen content of the gases removed from the means to absorb nitrogen oxides in water whereby accurate yield loss can be obtained and used in said means to change which is adapted to ratio the said last-mentioned change and the change in predetermined rate caused by said means to change.

References Cited in the file of this patent
UNITED STATES PATENTS

| | | |
|---|---|---|
| 1,811,233 | Harrison | June 23, 1931 |
| 2,697,652 | Ribble et al. | Dec. 21, 1954 |
| 2,808,316 | Hall | Oct. 1, 1957 |

OTHER REFERENCES

White: "Instruments and Automation," vol. 29, November 1956, pages 2212–2216.